US011041530B2

(12) United States Patent
    Back

(10) Patent No.: US 11,041,530 B2
(45) Date of Patent: Jun. 22, 2021

(54) SHAFT BEARING

(71) Applicant: VIBRACOUSTIC GMBH, Darmstadt (DE)

(72) Inventor: Friedrich Back, Müllheim (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 16/631,672

(22) PCT Filed: Jul. 13, 2018

(86) PCT No.: PCT/EP2018/069178
§ 371 (c)(1),
(2) Date: Jan. 16, 2020

(87) PCT Pub. No.: WO2019/016107
PCT Pub. Date: Jan. 24, 2019

(65) Prior Publication Data
US 2020/0191205 A1    Jun. 18, 2020

(30) Foreign Application Priority Data
Jul. 19, 2017   (DE) .......................... 102017116324.7

(51) Int. Cl.
*F16C 19/06*    (2006.01)
*F16C 27/06*    (2006.01)
(Continued)

(52) U.S. Cl.
CPC .............. *F16C 43/04* (2013.01); *F16C 19/06* (2013.01); *F16C 27/06* (2013.01); *F16C 33/04* (2013.01);
(Continued)

(58) Field of Classification Search
CPC ........ F16C 17/02; F16C 19/06; F16C 27/066; F16C 33/20; F16C 33/04; F16C 43/04; F16C 2326/06
(Continued)

(56) References Cited

U.S. PATENT DOCUMENTS 2,563,980 A * 8/1951 Wahlberg .............. F16C 27/066
                                                    384/536
2,933,354 A * 4/1960 Primeau ................. B60K 17/24
                                                    384/536
(Continued)

FOREIGN PATENT DOCUMENTS

CN    103375495 A    10/2013
CN    105275983 A    1/2016
(Continued)

OTHER PUBLICATIONS

International Search Report PCT/EP2018/069178, dated Nov. 13, 2018.
(Continued)

*Primary Examiner* — Marcus Charles
(74) *Attorney, Agent, or Firm* — Fishman Stewart PLLC

(57) ABSTRACT

A shaft bearing for mounting a shaft of a motor vehicle, having an inner sleeve, an outer body which surrounds the inner sleeve thereby forming a gap, and an elastomer body which connects the inner sleeve and the outer body elastically to one another. The inner sleeve may be embedded in the elastomer body and form a receiving opening for pressing in a bearing element. The inner sleeve may have at least one first deformation which is directed radially inwards in such a way that a shear gap is formed between the first deformation and the bearing element. An elastomer bead that may be formed when the bearing element is pressed in may be compressed within the shear gap.

16 Claims, 6 Drawing Sheets

(51) Int. Cl.
  *F16C 33/04* (2006.01)
  *F16C 43/04* (2006.01)
  *F16C 33/38* (2006.01)
(52) U.S. Cl.
  CPC ...... *F16C 33/3893* (2013.01); *F16C 2326/06* (2013.01)
(58) Field of Classification Search
  USPC ........ 384/428, 535–536, 559, 581–582, 435, 384/440
  See application file for complete search history.

(56) References Cited

U.S. PATENT DOCUMENTS

| | | | | |
|---|---|---|---|---|
| 3,639,015 A * | 2/1972 | Maas | ................... | F16C 27/066 384/536 |
| 3,756,675 A * | 9/1973 | Mangiavacchi | ...... | F16C 35/042 384/536 |
| 3,961,829 A * | 6/1976 | Bowen | ................... | F16C 27/066 384/536 |
| 4,025,135 A * | 5/1977 | Hishida | ................. | F16C 13/006 384/498 |
| 4,551,116 A | 11/1985 | Krude | | |
| 4,722,618 A * | 2/1988 | Matsumoto | ........... | F16C 27/066 384/535 |
| 5,501,531 A * | 3/1996 | Hamaekers | ............ | B60K 17/24 384/536 |
| 6,464,060 B1 | 10/2002 | Ponson | | |
| 6,572,271 B2 * | 6/2003 | Bade | ...................... | B60K 17/24 384/536 |
| 6,883,967 B2 * | 4/2005 | Robb | .................... | F16C 35/077 384/536 |
| 7,044,646 B1 * | 5/2006 | Aiken | ................... | B60K 17/24 384/536 |
| 8,591,117 B2 * | 11/2013 | Giraud | ................... | F16F 13/14 384/536 |
| 8,961,024 B2 * | 2/2015 | Ikeda | ...................... | F16C 27/066 384/536 |
| 9,328,772 B2 * | 5/2016 | Ikeda | ....................... | F16C 35/04 |
| 2002/0081050 A1 * | 6/2002 | Cermak | .................. | F16C 27/06 384/536 |
| 2003/0002760 A1 * | 1/2003 | Tatsumura | ............ | F16C 27/066 384/536 |
| 2008/0267550 A1 * | 10/2008 | Hirakawa | ................. | F16F 1/38 384/536 |
| 2018/0334030 A1 * | 11/2018 | Seipel | ................... | F16C 27/066 |

FOREIGN PATENT DOCUMENTS

| | | | | |
|---|---|---|---|---|
| DE | 3320760 A1 | 12/1984 | | |
| DE | 4320642 C1 | 1/1995 | | |
| DE | 102004041739 B4 * | 10/2008 | ............ | B60K 17/24 |
| DE | 102014107477 A1 * | 12/2015 | ............ | F16C 27/066 |
| DE | 102014107477 A1 | 12/2015 | | |
| DE | 102014110816 A1 * | 2/2016 | ............ | F16C 27/066 |
| DE | 102014110816 A1 | 2/2016 | | |
| DE | 102014110816 B4 | 6/2016 | | |
| DE | 102016120458 A1 * | 4/2018 | ............ | F16C 27/066 |
| FR | 2779193 A1 | 12/1999 | | |
| JP | 2013099995 A | 5/2013 | | |
| WO | WO-2018054620 A1 * | 3/2018 | .............. | F16F 15/08 |

OTHER PUBLICATIONS

Chinese Search Report, 2018800461377, dated Dec. 28, 2020.
Chinese Office Action, 201880046137.7, dated Jan. 5, 2021.
Translation of Chinese Office Action, 201880046137.7, dated Jan. 5, 2021.

* cited by examiner

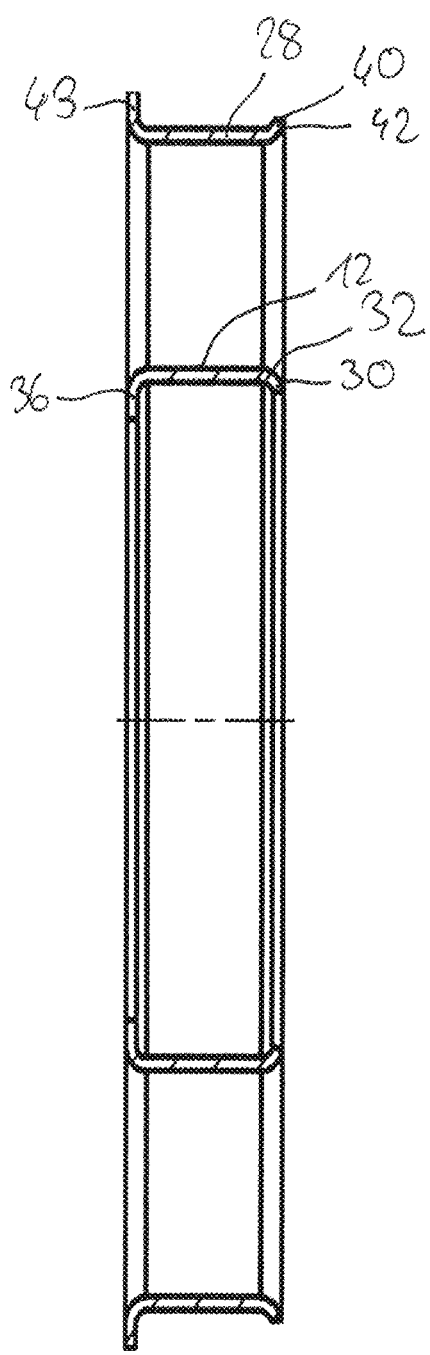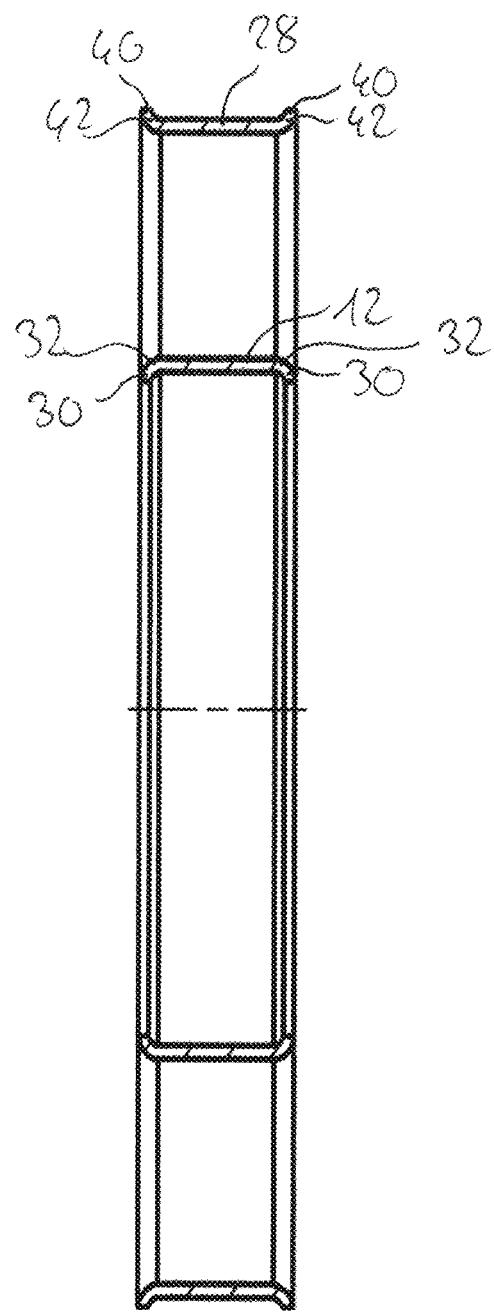
Fig. 3
Fig. 4

SHAFT BEARING

CROSS-REFERENCE TO RELATED APPLICATIONS

This application is a national phase of and claims priority to International Patent Application No. PCT/EP2018/069178, filed Jul. 13, 2018, which claims the benefit of German Patent Application Serial No. 10 2017 116 324.7, filed Jul. 19, 2017, each of which is hereby incorporated herein by reference in its entirety.

TECHNICAL FIELD

The invention relates to a shaft bearing for supporting a shaft, in particular a drive shaft of a motor vehicle, having an inner sleeve, an outer body surrounding the inner sleeve thereby forming a gap, and an elastomer body which elastically connects the inner sleeve and the outer body to one another.

BACKGROUND

A shaft bearing of the type mentioned above is used for supporting a shaft, in particular a drive shaft, such as a cardan shaft, for example, of a motor vehicle in order to dampen and/or isolate the vibrations occurring in the shaft during travel. Furthermore, the shaft bearing also serves to keep the shaft in position during travel and to absorb axial displacements during starting and braking and also to dampen and/or isolate noises, resonance frequencies and wobbling movements of the shaft.

The shaft bearing is connected via the outer body to a motor vehicle part, such as a motor vehicle floor or a motor vehicle body, and via a bearing element designed as a rolling bearing to the drive shaft. The bearing element may be directly vulcanised to the elastomer body or pressed into a receiving opening formed by the inner sleeve. In order to increase the static friction between the inner sleeve and the roller bearing, the inner sleeve is rubberised by being embedded in the elastomer body. The rubber coating serves to compensate tolerances and guarantees a tight fit of the bearing element without introducing too much stress into the bearing element.

From DE 102014 107 477 A1 and DE 10 2014 110 816 B4, shaft bearings are known which have an outer body, an inner sleeve and an elastomer body connecting the outer body and the inner sleeve. The inner sleeve is embedded in the elastomer body and has an edge portion bent radially inwards whose inner diameter is smaller than the outer diameter of a bearing element. This means that the bent edge portion serves as a stop when the bearing element is pressed in.

The present invention is based on the task of creating a shaft bearing which has an increased pressing force for pressing out a bearing element without simultaneously increasing the tension acting on the bearing element.

In order to solve this task, a shaft bearing is proposed.

Advantageous embodiments of the shaft bearing are also disclosed.

A shaft bearing for supporting a shaft, in particular a drive shaft of a motor vehicle, has an inner sleeve, an outer body surrounding the inner sleeve thereby forming a gap, and an elastomer body which elastically connects the inner sleeve and the outer body to one another, the inner sleeve being embedded in the elastomer body and forming a receiving opening for pressing in a bearing element, the inner sleeve having at least one first deformation which is directed radially inwards in such a way that a shear gap is formed between the first deformation and the bearing element, wherein an elastomer bead formed when the bearing element is pressed in can be compressed within the shear gap.

It has been recognised that, when a bearing element is pressed into the receiving opening, the elastomer is displaced and forms an elastomer bead against the direction of pressing in. The shear gap formed between the first deformation and the bearing element prevents the elastomer bead from being displaced when the bearing element is pressed out of the receiving opening. Instead, the elastomer bead is compressed in the shear gap. As a result, the resistance to pressing out the bearing element is greatly increased. Thus, the first deformation acts like a backstop by preventing the elastomer bead from being displaced. Thus, the press-out force is greatly increased by the resistance in a simple and cost-effective manner through the advantageous design of the intermediate sleeve, thus improving the tight fit of the bearing element. As a result, in order to reduce costs and weight, a bearing element, in particular a rolling bearing, can be used, whose pressing surface is reduced. In addition, the shear gap prevents the press-out forces from dropping, especially due to the influence of temperature, into critical ranges.

The elastomer body of the shaft bearing advantageously has a first leg and a second leg which are elastically connected to each other via a fold. Preferably, the inner sleeve is embedded in the first leg, which is directed radially inwards. The first leg rests on the bearing element and the second leg, directed radially outwards, rests on the outer body. Advantageously, the second leg is connected to the outer body positively, non-positively and/or by substance-to-substance connection. Advantageously, the second leg projects from the first leg at an angle after the vulcanisation of the elastomer body, so that the elastomer body abuts against the outer body with pretension in an opening of the outer body when it is inserted, especially pressed in. After insertion of the elastomer body, both legs are advantageously aligned parallel to each other.

The outer body may be designed as a sleeve, a ring or a bearing-support. The outer body is used to fasten the shaft bearing to a motor vehicle part, such as a motor vehicle body or floor, for example. The outer body may be made of metal or plastic, in particular fibre-reinforced plastic.

The inner sleeve may be made of metal or plastic, in particular fibre-reinforced plastic. In addition, the inner sleeve may be provided with openings penetrated by the elastomer of the elastomer body.

The bearing element may be a rolling bearing pressed into the receiving opening formed by the inner sleeve. The rolling bearing surrounds the shaft to be supported, in particular the drive shaft. When the rolling bearing is pressed into the receiving opening, the elastomer of the elastomer body is displaced and forms an elastomer bead inside the shear gap against the direction of pressing in.

SUMMARY

In an advantageous embodiment, an inner diameter of the first deformation is equal to or larger than an outer diameter of the bearing element. Since the inner diameter of the first deformation is equal to or larger than an outer diameter of the bearing element, a shear gap is formed between the first deformation and the bearing element, so that when the bearing element is pressed out of the receiving opening, the elastomer bead is not displaced but compressed in the shear gap. As a result, the resistance to pressing is greatly increased. The inner diameter of the first deformation and the outer diameter of the bearing element refer to the central axis of the shaft bearing.

In an advantageous embodiment, the inner sleeve has two first deformations. In particular, the first two deformations are spaced apart in such a way that the bearing element can be arranged between them, and a shear gap is formed between each first deformation and the bearing element.

In an advantageous embodiment, an outer sleeve is embedded in the elastomer body and has a second deformation which is directed radially outwards in such a way that a shear gap is formed between the second deformation and the outer body, wherein an elastomer bead formed when the elastomer body is pressed into the outer body is compressible within the shear gap. The shear gap formed between the outer body and the outer sleeve prevents the elastomer bead from being displaced inside the shear gap when the elastomer body is pressed out of the outer body, as the elastomer bead is compressed inside the shear gap. This increases the resistance against pressing the elastomer body out of the outer body. In addition, the outer sleeve creates an even surface pressure and thus ensures an even distribution of forces onto the outer body. In order to increase the static friction between the outer sleeve and the outer body, the outer sleeve is rubberized by being embedded in the elastomer body. The rubber coating serves to compensate tolerances and ensures a tight fit of the shaft bearing within the outer body. Advantageously, the outer sleeve is embedded in the second leg of the elastomer body, which is directed radially outwards. The outer sleeve can be made of metal or plastic, in particular fibre-reinforced plastic. Furthermore, the outer sleeve may be provided with openings penetrated by the elastomer of the elastomer body.

In an advantageous embodiment, an outer diameter of the second deformation is equal to or smaller than an inner diameter of the outer body. Since the outer diameter of the second deformation is equal to or smaller than an inner diameter of the outer body, a shear gap is formed between the second deformation and the outer body, as a result of which the elastomer bead formed when the elastomer element is pressed into the outer body is not displaced when the elastomer body is pressed out of the outer body, but is compressed in the shear gap. As a result, the resistance to pressing out is greatly increased. The outer diameter of the second deformation and the inner diameter of the outer body refer to the central axis of the shaft bearing.

In an advantageous embodiment, the outer sleeve has two second deformations. Preferably, the two second deformations are spaced apart in such a way that the outer body can be arranged between them, wherein a shear gap is formed between each second deformation and the outer body.

In an advantageous embodiment, the first deformation and/or the second deformation is a bent edge portion. Further advantageously, the first deformation is a radially inward-directed, bent, in particular flanged, edge portion of the inner sleeve and the second deformation is a radially outward-directed, bent, in particular flanged, edge portion of the outer sleeve. A bent edge portion can be produced easily and cost-effectively. If the inner sleeve and/or the outer sleeve are made of metal, the bent edge portion is advantageously produced by flanging. If the inner sleeve and/or the outer sleeve are made of plastic, the bent edge portion is advantageously produced during injection moulding.

In an advantageous embodiment, the first deformation and/or the second deformation is a corrugation. Further advantageously, the first deformation is a corrugation directed radially inwards and the second deformation is a corrugation directed radially outwards. Advantageously, a sleeve-shaped extension of the inner sleeve and/or the outer sleeve, whose inner diameter may be larger than, smaller than or equal to the inner diameter of the inner sleeve and/or the outer sleeve, is connected to the deformation in the shape of a corrugation. Advantageously, the sleeve-shaped extensions are connected to the inner sleeve and/or the outer sleeve using the same material.

In an advantageous embodiment, the first deformation and/or the second deformation is formed of portions which are partially punched out and bent. Further advantageously, the first deformation is formed from partially punched portions bent radially inwards and the second deformation is formed from partially punched portions bent radially outwards. The partially punched and bent portions are advantageously distributed at equidistant intervals around the circumference of the inner and/or outer sleeve.

In an advantageous embodiment, the first deformation and/or the second deformation is formed from bent edge tabs. Further advantageously, the first deformation is formed from first edge tabs bent radially inwards and the second deformation is formed from second edge tabs bent radially outwards. Advantageously, the bent edge tabs are arranged at equidistant intervals over the circumference of the inner and/or outer sleeve. Advantageously, the edge tabs are arranged on the end faces of the inner and/or outer sleeve and are connected to the inner and/or outer sleeve using the same material. Further advantageously, the edge tabs are rectangular projections of the inner sleeve and/or the outer sleeve.

In an advantageous embodiment, the inner sleeve and/or the outer sleeve has a bent leg portion whose inner diameter is larger than an outer diameter of the bearing element and/or whose outer diameter is larger than the inner diameter of the outer body. The bent leg portion serves as a stop when the bearing element is pressed into the receiving opening and/or as a stop when the elastomer body is pressed into the outer body.

In an advantageous embodiment, the elastomer body has a fastening portion for fastening the elastomer body to the outer body. The fastening portion may have a circumferential recess made in the elastomer body, into which a projection protruding from the outer body engages. The fastening portion may also have an abutment portion which abuts against an end face of the outer body.

In an advantageous embodiment, the fastening portion is fixed to the outer body by means of a retaining ring. The retaining ring serves to secure the elastomer body and prevents the elastomer body from being pulled out of the outer body. Further advantageously, the retaining ring may have a first fastening leg and a second fastening leg which enclose an angle. Advantageously, the first fastening leg rests against the abutment portion and the second fastening portion rests against the elastomer body in the region of the recess. Furthermore, the second fastening portion comprises a bent end portion adapted to engage behind the projection protruding from the outer body. The retaining ring may also be designed as a snap ring. Advantageously, the retaining ring is pressed onto the fastening portion to fasten the elastomer body to the outer body.

BRIEF DESCRIPTION OF THE DRAWINGS

In the following, a shaft bearing as well as further features and advantages are explained in more detail on the basis of exemplary embodiments, which are illustrated schematically in the figures. Shown are:

FIG. 3 is an enlarged representation of a cross-section through the inner sleeve and the outer sleeve of FIG. 1;

FIG. 4 is an enlarged representation of a cross-section through an inner sleeve and an outer sleeve according to a second design;

DETAILED DESCRIPTION

Figure 1:
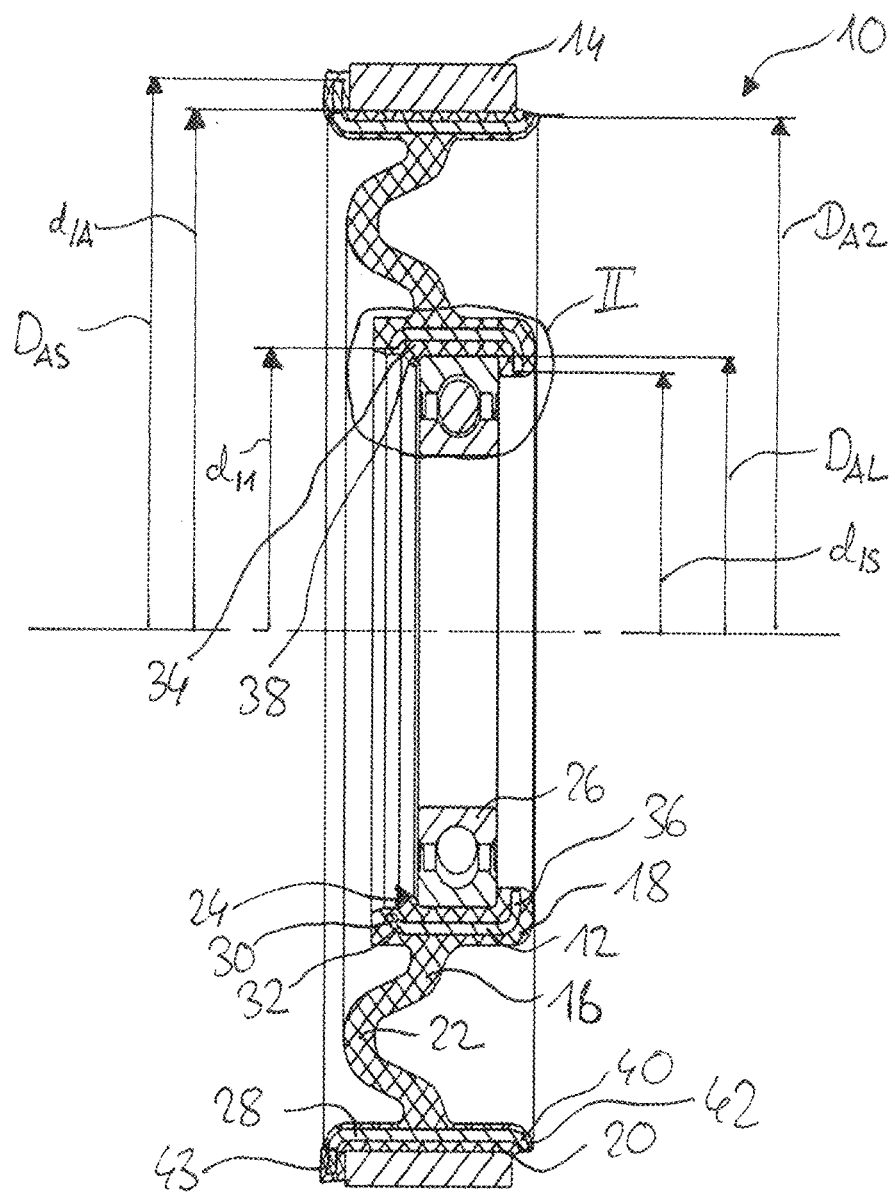
FIG. 1 is a cross-section through a shaft bearing according to a first embodiment comprising an inner sleeve and an outer sleeve according to a first embodiment and a bearing element.

FIG. 1 shows a shaft bearing 10 used to support a shaft (not shown), in particular a drive shaft, such as a cardan shaft, on a motor vehicle part (not shown), such as a motor vehicle body or motor vehicle floor.

The shaft bearing 10 has an inner sleeve 12, an outer body 14 which surrounds the inner sleeve 12 thereby forming a gap, and an elastomer body 16 which elastically connects the inner sleeve 12 and the outer body 14 to one another.

The elastomer body 16 has a first leg 18, a second leg 20 and a fold 22 connecting the two legs 18 and 20 to each other.

The inner sleeve 12 is embedded in the first leg 18, in particular by vulcanisation, and forms a receiving opening 24 for receiving a bearing element 26 which surrounds the shaft to be supported. The bearing element 26 is designed as a rolling bearing and pressed into the receiving opening 24.

Figure 2:
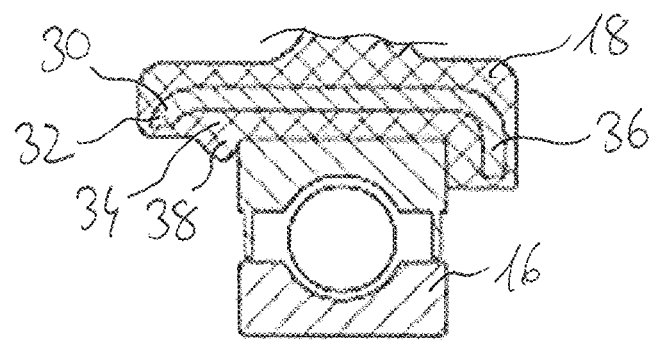
FIG. 2 is an enlarged representation of detail II in FIG. 1.

As can be seen in FIG. 3 in particular, the inner sleeve 12 has a first deformation 30 which is directed radially inwards. The first deformation 30 is a radially inward-directed, bent, in particular flanged, first edge portion 32 of the inner sleeve 12. The first deformation 30 has an inner diameter $d_{I1}$ which is smaller than an outer diameter $D_{AL}$ of the bearing element 26, as shown in FIG. 1. As can also be seen in FIG. 2, the first deformation 30 is distanced from the bearing element 26 and forms a shear gap 34.

At one end opposite the first deformation 30, the inner sleeve 12 has a first leg portion 36 bent radially inwards, whose inner diameter $d_{IS}$ is smaller than the outer diameter $D_{AL}$ of the bearing element 26. The first leg portion 36 serves as a stop when pressing the bearing element 26 into the receiving opening 24.

The inner sleeve 12 may be made of metal or plastic, in particular fibre-reinforced plastic. Furthermore, the inner sleeve 12 may have openings not shown which are penetrated by the elastomer of the elastomer body 16.

When the bearing element 26 is pressed into the receiving opening 24, the elastomer of the elastomer body 16 is displaced, and an elastomer bead 38 forms inside the shear gap 34 against the direction of pressing in. When the bearing element 26 is pressed out of the receiving opening 24, the elastomer bead 38 is compressed in the shear gap 34 so that the elastomer bead 38 is prevented from being displaced. This greatly increases the resistance of the bearing element 26 against being pressed out. The first deformation 30 thus acts as a backstop by preventing the elastomer bead 38 from being displaced.

The second leg 20 is in contact with the outer body 14, wherein the shaft bearing is attached to a motor vehicle part (not shown) via the outer body 14. For this purpose, the outer body 14 may be designed as a bearing support. The elastomer body 16 is pressed into the outer body 14, wherein an outer sleeve 28 is embedded, in particular by vulcanisation, in the second leg 20 to increase the surface pressure.

The outer sleeve 28 has a second deformation 40 which is directed radially outwards. The second forming 40 is a radially outward-directed, bent, in particular flanged, second edge portion 42 of the inner sleeve 12, as shown in FIG. 3. The second deformation 40 has an outer diameter $D_{A2}$ which is smaller than an inner diameter $d_{IA}$ of the outer body 14. The second deformation 40 is distanced from the outer body 14 and forms a shear gap 34.

At one end opposite to the second deformation 40, the outer sleeve 28 has a second leg portion 43 bent radially outwards, whose outer diameter $D_{AS}$ is larger than the inner diameter $d_{IA}$ of the outer body 14. The second leg portion 43 serves as a stop when pressing the elastomer body 16 into the outer body 14.

When the elastomer body 16 is pressed into the outer body 14, the elastomer of the elastomer body 16 is displaced, and an elastomer bead 38 forms inside the shear gap 34 against the direction of pressing in. When the elastomer body 16 is pressed out of the outer body 14, the elastomer bead 38 is compressed in the shear gap 34 so that displacement of the elastomer bead 38 is prevented. As a result, the resistance of the elastomer body 16 to being pressed out of the outer body 14 is greatly increased. The second deformation 40 thus acts as a backstop by preventing the elastomer bead 38 from being displaced.

Further embodiments of the inner sleeve 12 and the outer sleeve 28 as well as another embodiment of the shaft bearing 10 are described below. The previously used reference signs are used for the description of identical and functionally identical parts.

FIG. 4 shows a second embodiment of the inner sleeve 12 and the outer sleeve 28, which differs from the first embodiment in that the inner sleeve 12 has two first deformations 30 and the outer sleeve 28 two second deformations 40. The two first deformations 30 are each formed as radially inward-directed, bent, in particular flanged, first edge portions 32, so that one shear gap 34 is formed, respectively, between the two first deformations 30 and the bearing element 26, which prevents an elastomer bead 38 formed within each shear gap 34 from being displaced. The two second deformations 40 are each formed as radially outward-directed, bent, in particular flanged, second edge portions 42, so that one shear gap 34 is formed, respectively, between the second deformations 40 and the outer body 14, which prevents an elastomer bead 38 formed within each shear gap 34 from being displaced.

Figure 5:
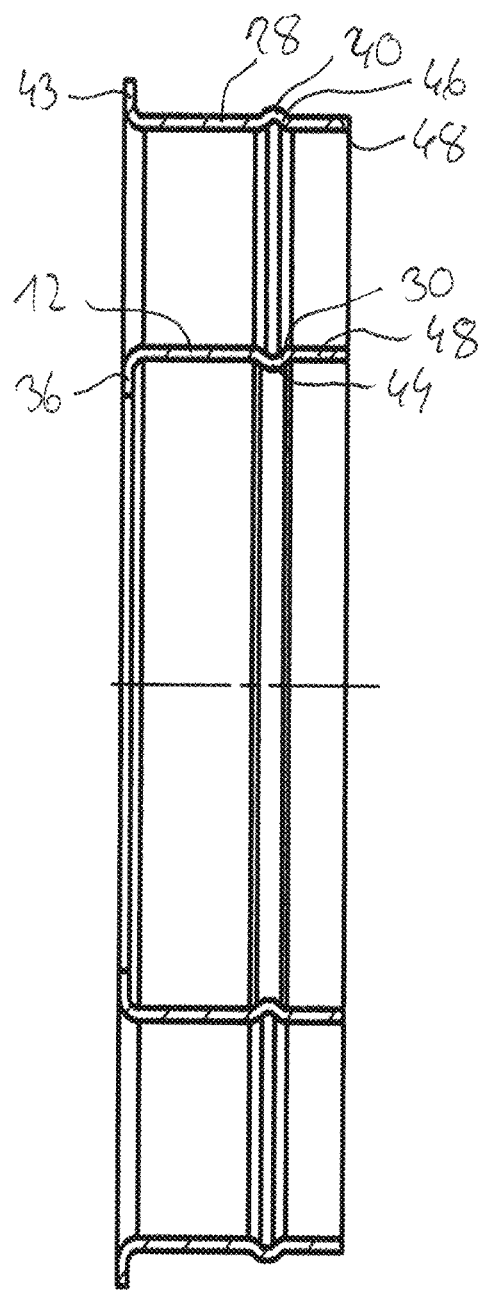
FIG. 5 is an enlarged representation of a cross section through an inner sleeve and an outer sleeve according to a third embodiment.

FIG. 5 shows a third embodiment of the inner sleeve 12 and the outer sleeve 28, which differs from the first two embodiments in that the first deformation 30 is a radially inward-directed first corrugation 44 and the second deformation 40 is a radially outward-directed second corrugation 46. Sleeve-shaped extensions 48 of the inner sleeve 12 and the outer sleeve 28 are connected to each of the corrugations 44, 46, respectively.

Figure 6:
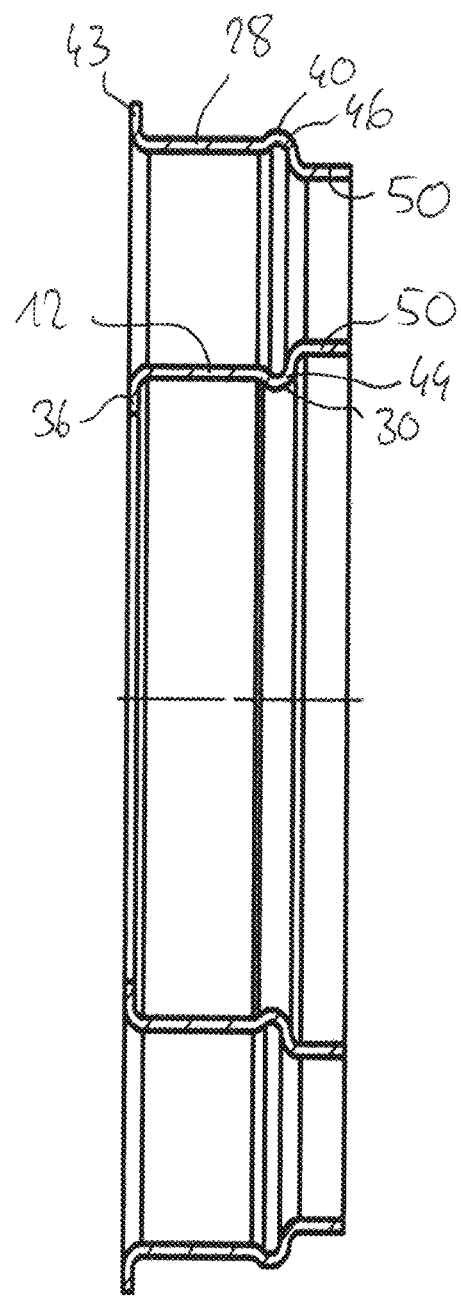
FIG. 6 is an enlarged representation of a cross section through an inner sleeve and an outer sleeve according to a fourth embodiment.

FIG. 6 shows a fourth embodiment of the inner sleeve 12 and the outer sleeve 28, which differs from the third embodiment in that the sleeve-shaped extension 48 of the inner sleeve 12 is offset radially outwards and the sleeve-shaped extension 48 of the outer sleeve 28 is offset radially inwards.

Figure 7:
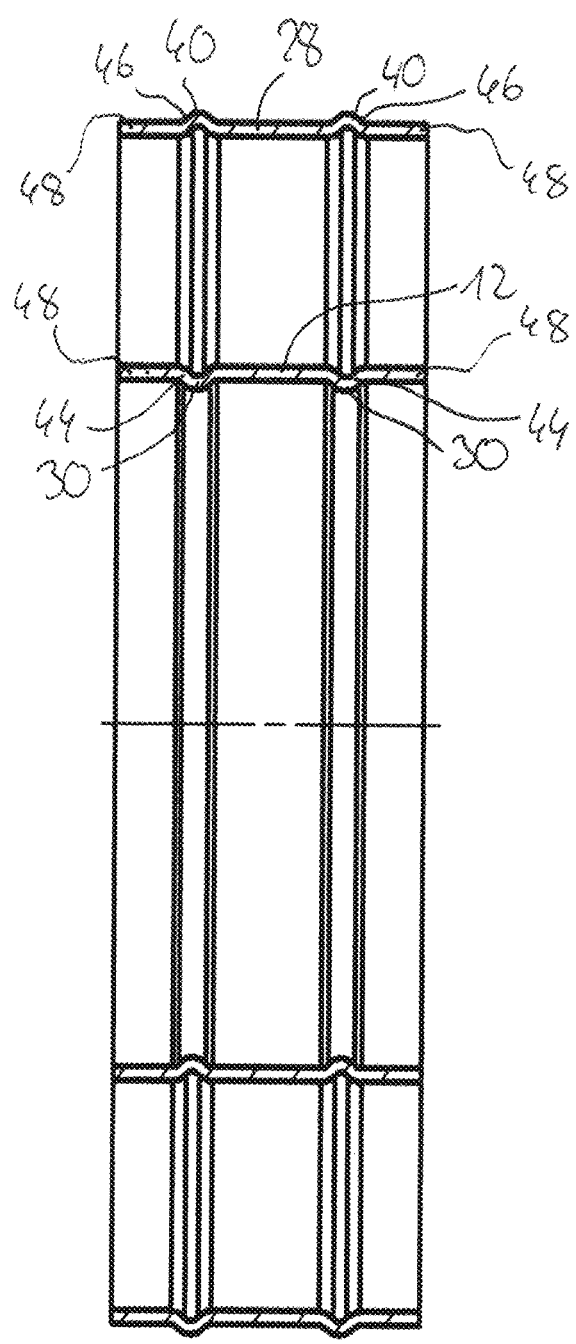
FIG. 7 is an enlarged representation of a cross section through an inner sleeve and an outer sleeve according to a fifth embodiment.

FIG. 7 shows a fifth embodiment of the inner sleeve 12 and the outer sleeve 28, which differs from the third embodiment in particular in that the inner sleeve 12 has two first corrugations 44 and the outer sleeve 28 two second corrugations 46, each corrugation 44, 46 being followed by a sleeve-shaped extension 48.

Figure 8:
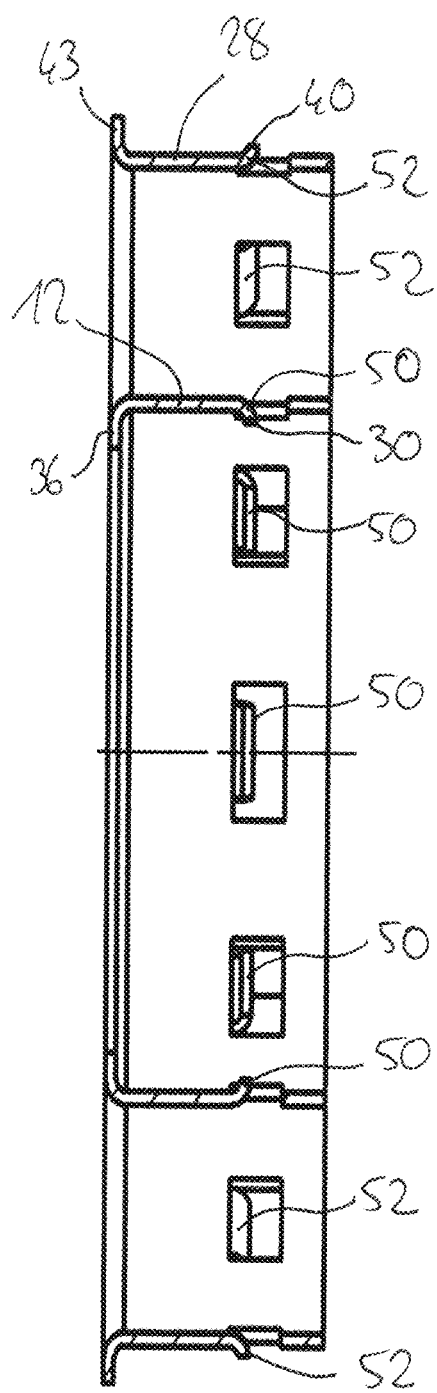
FIG. 8 is an enlarged representation of a cross section through an inner sleeve and an outer sleeve according to a sixth embodiment.

FIG. 8 shows a sixth embodiment of the inner sleeve 12 and the outer sleeve 28, which differs from the other embodiments in that the first deformation 30 is formed of partially punched first portions 50 bent radially inwards and the second deformation 40 is formed of partially punched second portions 52 bent radially outwards. The portions 50, 52 are arranged at equidistant intervals over the circumference of the inner sleeve 12 and the outer sleeve 28.

Figure 9:
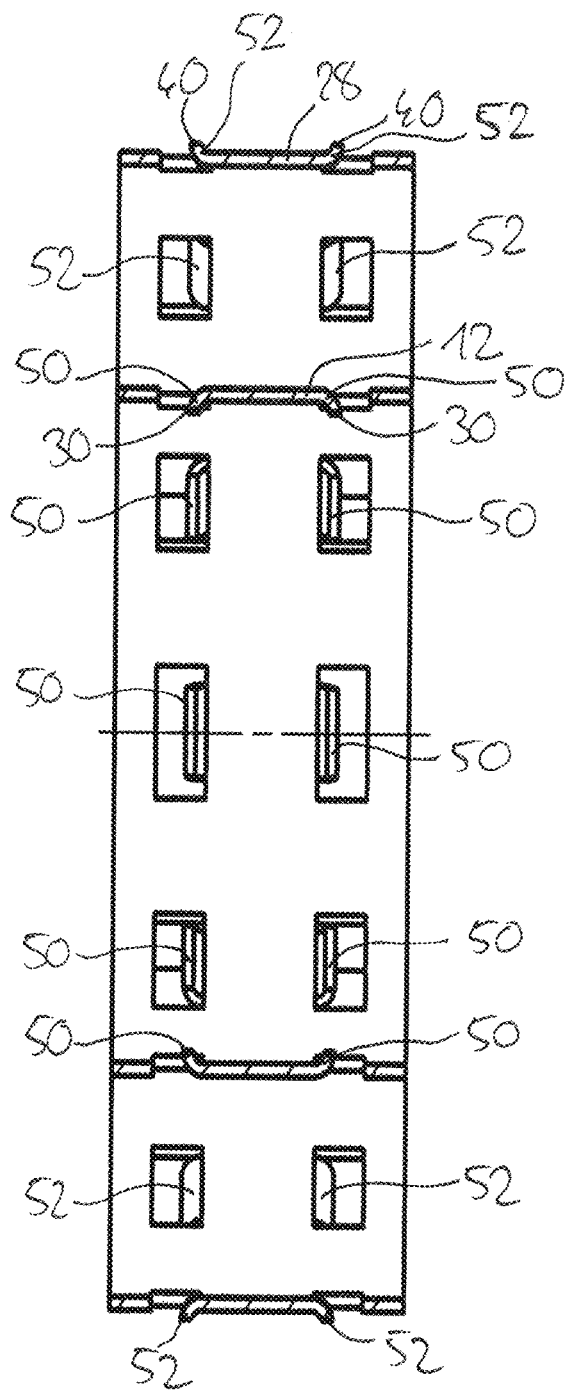
FIG. 9 is an enlarged representation of a cross section through an inner sleeve and an outer sleeve according to a seventh embodiment.

FIG. 9 shows a seventh embodiment of the inner sleeve 12 and the outer sleeve 28, which differs from the sixth embodiment in that the inner sleeve 12 has two partially punched-out first portions 50 bent radially inwards and the outer sleeve 28 has two partially punched-out second portions 52 bent radially outwards.

Figure 10:
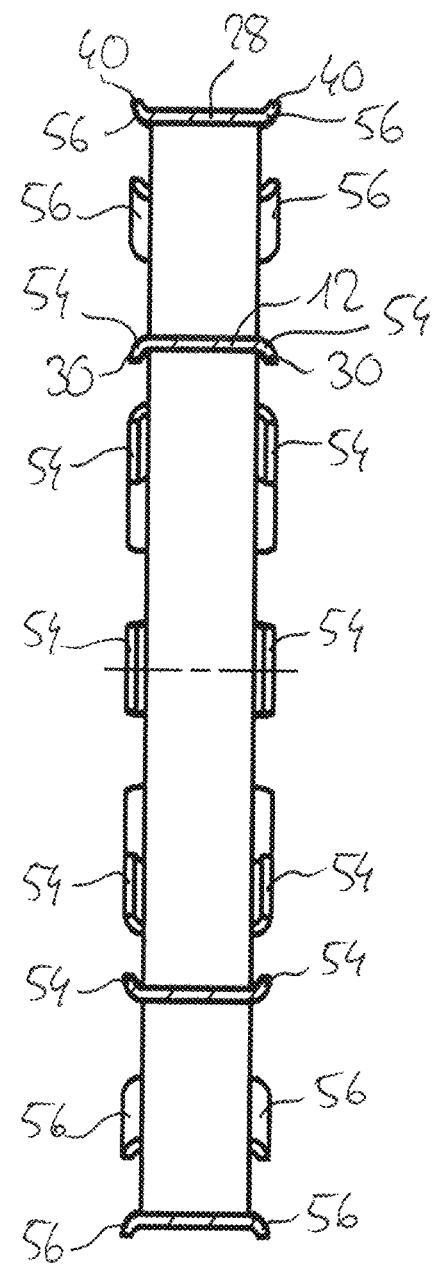
FIG. 10 is an enlarged representation of a cross-section through an inner sleeve and an outer sleeve according to an eighth embodiment.

FIG. 10 shows an eighth embodiment of the inner sleeve 12 and the outer sleeve 28, which differs from the other embodiments in that the first deformation 30 is formed of radially inward bent first edge tabs 54 and the second deformation 40 is formed of radially outward bent second edge tabs 56. The edge tabs 54, 56 are arranged at equidistant intervals over the circumference of the inner sleeve 12 and the outer sleeve 28. The edge tabs 54, 56 are arranged at the end faces of the inner sleeve 12 and the outer sleeve 28 and are connected to the inner sleeve 12 and the outer sleeve 28 using the same material. The edge tabs 54, 56 are rectangular projections of the inner sleeve 12 and the outer sleeve 28.

Figure 11:
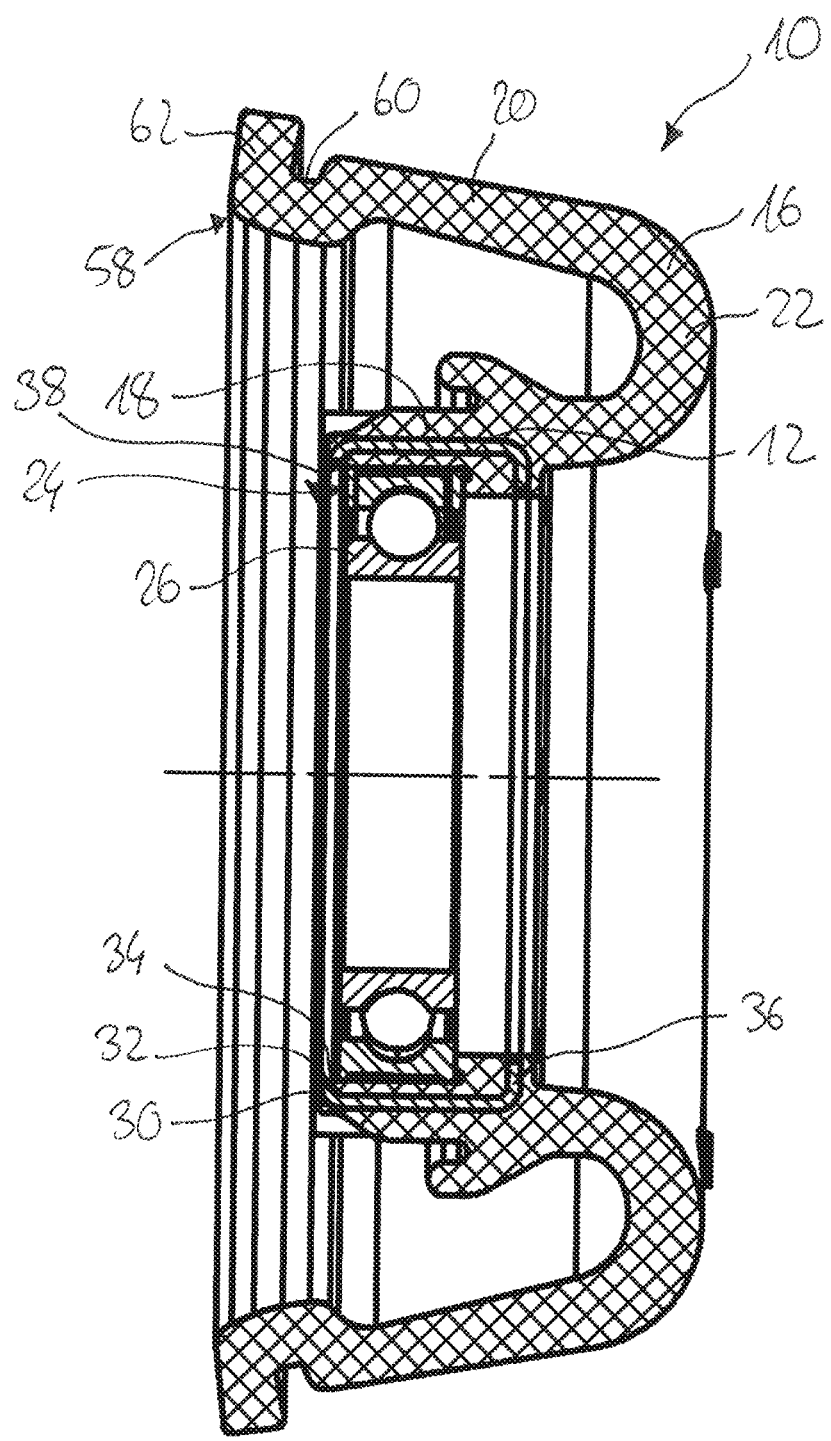
FIG. 11 is a cross-section through a shaft bearing according to a second embodiment without an outer body, having an inner sleeve according to a first embodiment and a bearing element.

FIG. 11 shows a second embodiment of the shaft bearing 10 without an outer body 14, which differs from the first embodiment in the design of the elastomer body 16 and in the missing outer sleeve 28.

The second leg 20 of the elastomer body 16 has a fastening portion 58 comprising a circumferential recess 60 and a collar portion 62. The elastomer body 16 is fastened to an outer body via the fastening portion 52. First, the second leg 20 is compressed and the elastomer body 16 is inserted into the outer body, with a projection formed in the outer body engaging in the circumferential recess 60 and the collar portion 62 resting against an end face of the outer body 14. To secure the elastomer body 14 against being pulled out of the outer body, a retaining ring (not shown) is pressed onto the fastening portion 58.

The embodiments shown in the figures for the inner sleeve 12 and for the outer sleeve 28 may be combined as desired. For example, an inner sleeve 12 according to a first embodiment may be combined with an outer sleeve 28 according to a sixth embodiment, or an inner sleeve 12 according to an eighth embodiment may be combined with an outer sleeve 28 according to a first embodiment.

The invention claimed is:

1. A shaft bearing for mounting a shaft of a motor vehicle, the shaft bearing comprising:
    an inner sleeve;
    an outer body that surrounds the inner sleeve thereby forming a gap; and
    an elastomer body that connects the inner sleeve and the outer body elastically to one another;
    wherein the inner sleeve is embedded in the elastomer body and forms a receiving opening for pressing in a bearing element, the inner sleeve has at least one first deformation that is directed radially inwards such that a shear gap is formed between the first deformation and the bearing element; and an elastomer bead that is formed when the bearing element is pressed in can be compressed within the shear gap; and wherein an outer sleeve is embedded in the elastomer body and has a second deformation that is directed radially outwards such that a shear gap is formed between the second deformation and the outer body, and an elastomer bead formed when the elastomer body is pressed into the outer body can be compressed within the shear gap.

2. The shaft bearing according to claim 1, wherein an inner diameter of the first deformation is equal to or greater than an outer diameter of the bearing element.

3. The shaft bearing according to claim 1, wherein the inner sleeve has two first deformations.

4. The shaft bearing according to claim 1, wherein an outer diameter of the second deformation is equal to or smaller than an inner diameter of the outer body.

5. The shaft bearing according to claim 1, wherein the outer sleeve has two second deformations.

6. The shaft bearing according to claim 1, wherein the first deformation comprises a bent edge portion.

7. The shaft bearing according to claim 1, wherein the first deformation and/or the second deformation comprises a bent edge portion.

8. The shaft bearing according to claim 1, wherein the first deformation is a corrugation.

9. The shaft bearing according to claim 1, wherein the first deformation and/or the second deformation is a corrugation.

10. The shaft bearing according to claim 1, wherein the first deformation is formed of portions that are partially punched out and bent.

11. The shaft bearing according to claim 1, wherein the first deformation and/or the second deformation is formed of portions that are partially punched out and bent.

12. The shaft bearing according to claim 1, wherein the first deformation is formed from bent edge tabs.

13. The shaft bearing according to claim 1, wherein the first deformation and/or the second deformation is formed from bent edge tabs.

14. The shaft bearing according to claim 1, wherein the inner sleeve has a bent leg portion whose inner diameter is smaller than an outer diameter of the bearing element.

15. The shaft bearing according to claim 1, wherein the inner sleeve and/or the outer sleeve has a bent leg portion whose inner diameter is smaller than an outer diameter of the bearing element and/or whose outer diameter is larger than the inner diameter of the outer body.

16. A shaft bearing for mounting a shaft of a motor vehicle, the shaft bearing comprising:

an inner sleeve;

an outer body that surrounds the inner sleeve thereby forming a gap;

an elastomer body that connects the inner sleeve and the outer body elastically to one another; and a bearing element;

wherein the inner sleeve is embedded in the elastomer body and forms a receiving opening for pressing in a bearing element, the inner sleeve has at least one first deformation that is directed radially inwards such that a shear gap is formed between the first deformation and the bearing element; wherein an inner diameter of the first deformation is equal to or greater than an outer diameter of the bearing element; and wherein elastomer of the elastomer body is displaced when the bearing element is pressed into the receiving opening and forms an elastomer bead against the direction of pressing in, the elastomer bead can be compressed within the shear gap.

* * * * *